United States Patent
Kitamura et al.

(10) Patent No.: US 7,356,194 B2
(45) Date of Patent: Apr. 8, 2008

(54) IMAGE PROCESSING METHOD, APPARATUS, AND PROGRAM

(75) Inventors: Yoshiro Kitamura, Kanagawa-ken (JP); Wataru Ito, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 586 days.

(21) Appl. No.: 11/052,902

(22) Filed: Feb. 9, 2005

(65) Prior Publication Data

US 2005/0175247 A1    Aug. 11, 2005

(30) Foreign Application Priority Data

Feb. 10, 2004    (JP) .............................. 2004-033291

(51) Int. Cl.
*G06K 9/40*    (2006.01)
(52) U.S. Cl. ..................... 382/254; 382/260; 382/274; 382/275; 382/282; 358/3.26; 358/3.27; 358/463
(58) Field of Classification Search ................ 382/254, 382/255, 263, 264, 274, 275, 282; 358/3.26, 358/3.27, 463
See application file for complete search history.

(56) References Cited

U.S. PATENT DOCUMENTS

| | | | |
|---|---|---|---|
| 5,546,133 A * | 8/1996 | Honma ........................ 348/642 |
| 5,991,457 A | 11/1999 | Ito et al. | |
| 6,295,382 B1 * | 9/2001 | Karanovic ................... 382/261 |
| 6,681,054 B1 * | 1/2004 | Gindele ....................... 382/272 |
| 6,804,408 B1 * | 10/2004 | Gallagher et al. .......... 382/272 |
| 6,990,252 B2 * | 1/2006 | Shekter ....................... 382/276 |

FOREIGN PATENT DOCUMENTS

JP    2001-118064 A    4/2001

OTHER PUBLICATIONS

H. Kondo et al., "Colored Face Image Processing by Vector ∈-Filter-Removal of Wrinkles—", Drafts in the National Meeting of the Academic Society for Electronic Information Communication, D-11-143, p. 143,(1998).

* cited by examiner

*Primary Examiner*—Yosef Kassa
(74) *Attorney, Agent, or Firm*—Birch, Stewart, Kolasch & Birch, LLP

(57) ABSTRACT

A blurred image generating section generates a plurality of blurred images Sm (where m=1 to n and n≧2) different in frequency response characteristic from one another, based on an original image S0. A band-limited image generating section generates a plurality of band-limited images Tm by performing a subtraction between images of adjacent frequency bands, employing the original image S0 and each of the blurred images Sm. A wrinkle component extraction section extracts converted images, obtained by performing nonlinear conversion on each of the band-limited images Tm, as wrinkle components Qm contained in the different frequency bands. A wrinkle-component elimination section eliminates wrinkle components of the original image S0 by subtracting from the original image S0 a value obtained by multiplying a subtraction coefficient β (which is determined according to the pixel value Y0 of the original image S0) and the sum of the wrinkle components Qm together.

11 Claims, 5 Drawing Sheets

| 0.0025 | 0.0125 | 0.02 | 0.0125 | 0.0025 |
| --- | --- | --- | --- | --- |
| 0.0125 | 0.0625 | 0.1 | 0.0625 | 0.0125 |
| 0.02 | 0.1 | 0.16 | 0.1 | 0.02 |
| 0.0125 | 0.0625 | 0.1 | 0.0625 | 0.0125 |
| 0.0025 | 0.0125 | 0.02 | 0.0125 | 0.0025 |

| 0.1 | 0.5 | 0.8 | 0.5 | 0.1 |
| --- | --- | --- | --- | --- |

F1

| 0.05 | 0.13 | 0.3 | 0.5 | 0.65 | 0.74 | 0.65 | 0.5 | 0.3 | 0.13 | 0.05 |
| --- | --- | --- | --- | --- | --- | --- | --- | --- | --- | --- |

F2

IMAGE PROCESSING METHOD, APPARATUS, AND PROGRAM

BACKGROUND OF THE INVENTION

1. Field of the Invention

The present invention relates to an image processing method and apparatus for performing the process of inhibiting noise, wrinkle, and spot components on a photographic image to enhance the picture quality, and to a program for carrying out that method.

2. Description of the Related Art

Skin-beautifying processes have hitherto been performed for the purpose of inhibiting or eliminating wrinkles and spots from a photographic image containing a person's face (hereinafter referred to simply as an image). For example, low-pass filters that are usually used for eliminating noise can be applied. However, while low-pass filters can inhibit wrinkle, spot, and noise components from an image, they will degrade an edge portion contained in an image signal and blur the entire image.

An $\epsilon$-filter ($\epsilon$-separation nonlinear digital filter), which is designed to separate and inhibit a high-frequency noise component of low amplitude contained in an image by generating use of the fact that many of the wrinkle and spot components exist as signals of low amplitude in the high-frequency component of an image, is also applied to eliminate wrinkles and spots (Arakawa, et al., "Face Image Processing by a Vector($\epsilon$)-Filter, and Elimination of Wrinkle Components," Drafts in the National Meeting of the Academic Society for Electronic Information Communication, March 1998, D-11-43, p. 143). Since the $\epsilon$-filter has the property of flattening only a change in the level of low amplitude contained in an image signal, an image processed by the $\epsilon$-filter preserves edges having a sharp change in the level of the amplitude and hardly loses the entire sharpness.

The $\epsilon$-filter is basically constructed to subtract from an original image signal a value obtained by applying a nonlinear function to a change of quantity in the level of the amplitude of the signal. This nonlinear function outputs a value of 0 when the amplitude of a signal is greater than a predetermined threshold value ($\epsilon_0$). That is, when the $\epsilon$-filter is employed, the output of the nonlinear function is 0 at a part in an image that has an amplitude greater than the aforementioned threshold value. In a processed image, the original signal of a part having an amplitude greater than the aforementioned threshold value is preserved. On the other hand, in a part whose amplitude is the aforementioned threshold value or less, the signal value of that processed part is a value obtained by subtracting the output of the nonlinear function (where the absolute value is greater than 0) from the original signal value. In this manner, at parts in the processed image which contain not so-called noise but wrinkles and spots exhibiting a change in light and darkness of low amplitude, the change in light and shade is smoothed. As a result, edges whose amplitude is high can be preserved while generating wrinkles and spots indistinct.

Japanese Unexamined Patent Publication No. 2001-118064 discloses a method for preserving skin grain and texture while eliminating wrinkles and spots. In this method, wrinkle and spot components are extracted by a nonlinear function having a large threshold value ($\epsilon_0$), and grain and texture components are extracted by another nonlinear function having a small threshold value ($\epsilon_0$). The extracted wrinkle and spot components are subtracted from the original signal, and the extracted grain and texture components are added to the original signal. In this manner, skin grain and texture are preserved while eliminating wrinkles and spots.

In addition, a variety of techniques have been proposed for extracting signals of different frequency bands from an image. For instance, U.S. Pat. No. 5,991,457 discloses a method for generating a plurality of blurredly masked images different in frequency response characteristics from one another, based on an original image and also generating a plurality of band-limited images respectively representing signals of different frequency bands of the original image, based on the original image and blurredly masked images, or based on the blurredly masked images. U.S. Pat. No. 5,991,457 discloses a method for efficiently generating a blurredly masked image by reducing the amount of calculation required in generating the blurredly masked image.

However, many of the wrinkle and spot components exist in high-frequency bands, but they exist over the entire range from high-frequency bands to low-frequency bands. The aforementioned skin-beautifying process method utilizing the $\epsilon$-filter cannot completely eliminate wrinkle and spot components, because it extracts the wrinkle and spot components only in a single frequency band and subtracts the extracted components from the original image. In the aforementioned method for extracting wrinkle and spot components at a single frequency band, if the effect of eliminating wrinkles and spots are to be improved, filtering must be enhanced at the single frequency band, that is, the aforementioned threshold value ($\epsilon_0$) for extracting wrinkles and spots must be increased. However, this can easily introduce artifacts into a processed image and debase the picture quality.

SUMMARY OF THE INVENTION

In view of the circumstances mentioned above, it is an object of the present invention to provide an image processing method and an image processing apparatus that are capable of obtaining a processed image of good quality while effectively eliminating wrinkles, spots, and noise. Another object of the present invention is to provide a program for carrying out the image processing method.

To achieve the aforementioned objects of the present invention, the image processing method of the present invention includes four major steps: (1) a step of generating a plurality of band-limited images respectively representing components of a plurality of frequency bands of a photographic image, based on the photographic image; (2) a step of obtaining a plurality of converted images by performing on respective pixel values of the band-limited images a nonlinear conversion process, in which an absolute value of an output value is reduced to an absolute value of an input value or less, and in which, for an input value whose absolute value is a predetermined threshold value or less, an absolute value of an output value becomes greater as an absolute value of the input value becomes greater and, for an input value whose absolute value is greater than the predetermined value, an absolute value of an output value becomes less than or equal to an absolute value of an output value corresponding to the predetermined threshold value; (3) a step of multiplying the pixel values of the converted images by a predetermined subtraction coefficient; and (4) a step of obtaining a pixel value of a processed image by subtracting the pixel values of the converted images multiplied by the predetermined subtraction coefficient, from a pixel value of the photographic image.

The aforementioned "photographic image" includes not only digital image obtained by digital cameras, but also digital images obtained by reading out images from a silver salt photographic film or print with a reader such as a scanner. An "image" as used herein also refers to a photographic image, for the sake of convenience.

The predetermined subtraction coefficient may employ the same coefficient for each of the pixels of the aforementioned photographic image, but it is preferably determined according to a pixel value of the photographic image.

For example, a noise component often occurs at dark parts in an image that have a small luminance value. Therefore, by employing a subtraction coefficient that becomes smaller as a pixel value becomes greater (or becomes greater as a pixel value becomes smaller), the noise eliminating effect can be enhanced.

Also, wrinkle and spot components exist in skin parts, which are brighter than hair. Therefore, by employing a subtraction coefficient that becomes greater as a pixel value (e.g., a luminance value) becomes greater (or becomes smaller as a pixel value becomes smaller), a noise component can be eliminated and, at the same time, the effect of inhibiting wrinkle and spot components, that is, the effect of beautifying the skin can be obtained.

In the image processing method of the present invention, the nonlinear conversion process is preferably the process of generating an absolute value of an output value approximately constant for an input value whose absolute value is greater than the predetermined threshold value.

In the image processing method of the present invention, the predetermined threshold value is preferably determined according to a frequency band of the band-limited image to be processed.

The image processing apparatus of the present invention comprises three major parts: (1) band-limited image generating means for generating a plurality of band-limited images respectively representing components of a plurality of frequency bands of a photographic image, based on the photographic image; (2) nonlinear conversion means for obtaining a plurality of converted images by performing on respective pixel values of the band-limited images an on linear conversion process, in which an absolute value of an output value is reduced to an absolute value of an input value or less, and in which, for an input value whose absolute value is a predetermined threshold value or less, an absolute value of an output value becomes greater as an absolute value of the input value becomes greater and, for an input value whose absolute value is greater than the predetermined value, an absolute value of an output value becomes less than or equal to an absolute value of an output value corresponding to the predetermined threshold value; and (3) frequency inhibition means for multiplying the pixel values of the converted images by a predetermined subtraction coefficient, and for obtaining a pixel value of a processed image by subtracting the pixel values of the converted images multiplied by the predetermined subtraction coefficient, from a pixel value of the photographic image.

In the image processing apparatus of the present invention, the aforementioned subtraction coefficient is preferably determined according to a pixel value of the photographic image.

Particularly, in order to enhance the effect of the skin beautifying process for inhibiting wrinkle and spot components, the aforementioned subtraction coefficient is preferably determined according to a pixel value of the photographic image, so that it becomes greater as the pixel value becomes greater.

In the image processing apparatus of the present invention, the aforementioned nonlinear conversion means preferably causes an absolute value of an output value to be approximately, constant for an input value whose absolute value is greater than the predetermined threshold value.

In the image processing apparatus of the present invention, the aforementioned threshold value is preferably determined according to a frequency band of the band-limited image to be processed.

The program of the present invention is a program for causing a computer to carry out the image processing method of the present invention.

Note that the program of the present invention may be provided being recorded on a computer readable medium. Those who are skilled in the art would know that computer readable media are not limited ot any specific type of device, and include, but are not limited to: floppy disks, CD's, RAM's, ROM's, hard disks, magnetic tapes, and internet downloads, in which computer instructions can be stored and/or transmitted. Transmission of the computer instructions through a network or through wireless transmission means is also within the scope of this invention. Additionally, computer instructions include, but are not limited to: source, object and executable code, and can be in any language, including higher level languages, assembly language, and machine language.

The image processing method, apparatus, and program of the present invention generate a plurality of band-limited images respectively representing components of a plurality of frequency bands of a photographic image, based on the photographic image and then obtain a plurality of converted images by performing a nonlinear conversion process on the band-limited images. The nonlinear conversion process is the process of reducing an absolute value of an output value to an absolute value of an input value or less. At the same time, for an input value whose absolute value is a predetermined threshold value or less, an absolute value of an output value becomes greater as an absolute value of the input value becomes greater. For an input value whose absolute value is greater than the predetermined value, an absolute value of an output value becomes less than or equal to an absolute value of an output value corresponding to the predetermined threshold value. The converted image obtained by this nonlinear conversion process represents a component of low amplitude such as wrinkles, spots, and noise, contained in a frequency band to which the converted image corresponds. The present invention obtains the pixel value of a processed image by multiplying the pixel values of the converted images by a predetermined subtraction coefficient, and then subtracting the obtained value from the pixel value of the original photographic image. In this manner, the wrinkle, spot, and noise components in the different frequency bands of the photographic image can be effectively eliminated from the photographic image.

In the conventional skin-beautifying technique for extracting wrinkle and spot components contained at a single frequency band, the nonlinear process at the single frequency band must be enhanced (i.e., a threshold value for extracting wrinkle and spot components must be increased) in order to raise the skin-beautifying effect. This can easily introduce artifacts into a processed image and degrade the picture quality. In the present invention, wrinkle components are eliminated in a plurality of different frequency bands. Therefore, a good noise eliminating effect or skin beautifying effect can be obtained without considerably enhancing the nonlinear process at each frequency band. As a result, artifacts can be prevented and a processed image of high picture quality can be obtained.

BRIEF DESCRIPTION OF THE DRAWINGS

The present invention will be described in further detail with reference to the accompanying drawings wherein.

DESCRIPTION OF THE PREFERRED EMBODIMENTS

Figure 1:
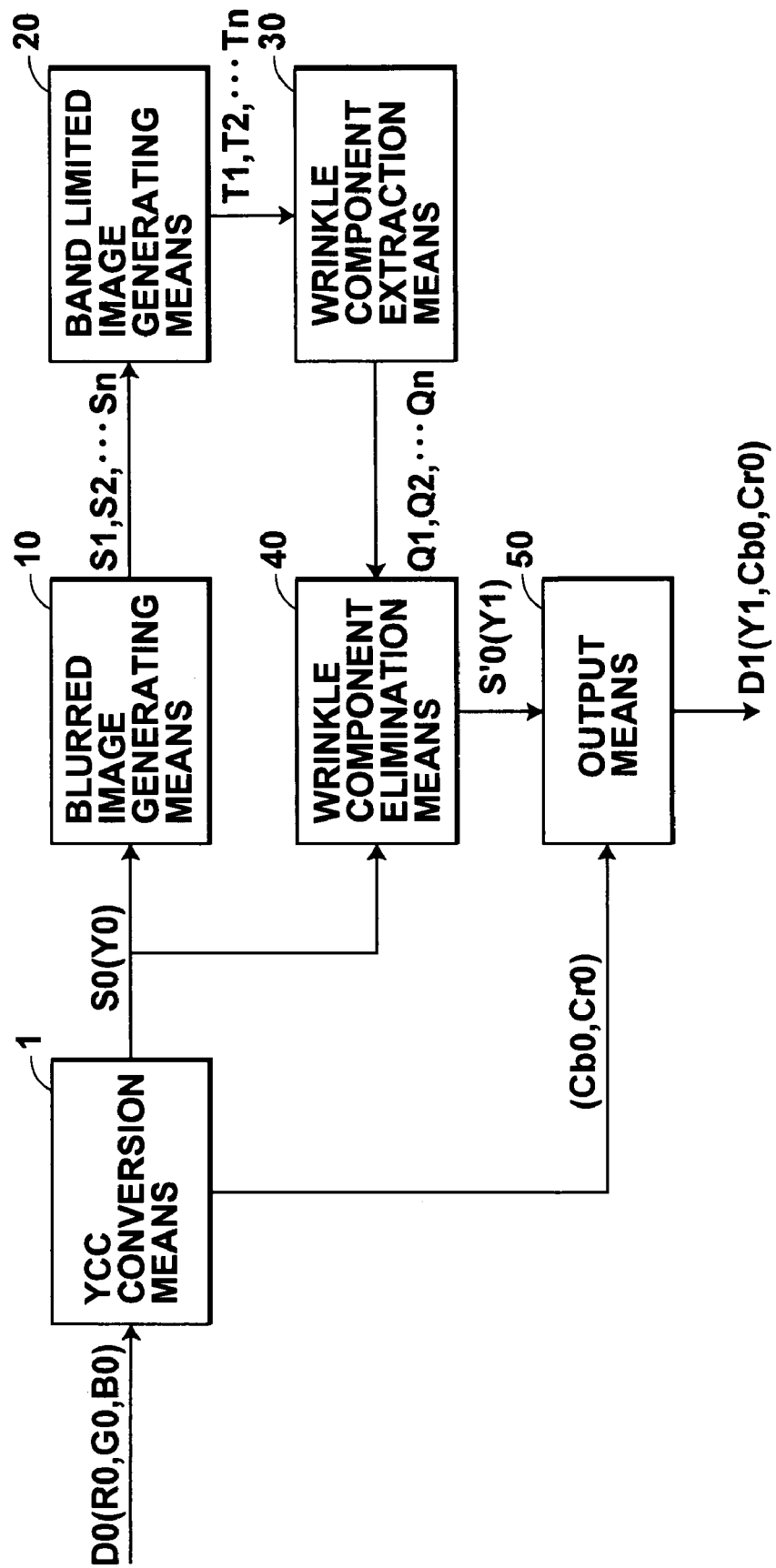
FIG. 1 is a block diagram showing an image processing apparatus constructed in accordance with a preferred embodiment of the present invention.

Referring initially to FIG. 1, there is shown an image processing apparatus constructed in accordance with a preferred embodiment of the present invention. The image processing apparatus of the preferred embodiment is used to perform a skin-beautifying process on an input photographic image and is realized by carrying out a skin-beautifying process program read in an auxiliary storage by a computer (e.g., a personal computer, etc.). Note that the skin-beautifying process program can be stored in an information storage medium such as CD-ROM, etc., or can be installed in a computer through a network such as the Internet, etc.

Also, because image data represents an image, a description will hereinafter be given without discriminating between them.

As shown in FIG. 1, the image processing apparatus of the preferred embodiment includes four parts: (1) blurred image generating means 10 for generating a plurality of blurred images S1, S2, . . . , and Sn (where n is an integer≧2) different in frequency response characteristic from one another, based on an original image S0; (2) band-limited image generating means 20 for generating a plurality of band-limited images T1, T2, . . . , and Tn by employing the original image S0 and blurred images S1, S2, . . . , and Sn; (3) wrinkle-component extraction means 30 for extracting wrinkle components Q1, Q2, . . . , and Qn contained in the frequency bands to which the band-limited images T1, T2, . . . , and Tn correspond, by performing a nonlinear conversion process on each of the band-limited images T1, T2, . . . , and Tn; and (4) wrinkle-component elimination means 40 for obtaining a wrinkle-eliminated image S'(Y1) by eliminating the wrinkle components Q1, Q2, . . . , and Qn from the original image S0. Since these means perform processing in a luminance space, the image processing apparatus of the preferred embodiment further includes two parts: (1) YCC conversion means 1 for obtaining the luminance component Y0 (which forms the aforementioned original image S0) and two color difference components Cb0 and Cr0 of an input image D0 (R0, G0, and B0) by performing YCC conversion on the input image D0; and (2) output means 50 for outputting as a processed image D1 (Y1, Cb0, and Cr0) an image comprising the pixel value Y1 of the wrinkle-eliminated image S'0, obtained by the wrinkle-component elimination means 40, and the two color difference components Cb0 and Cr0, obtained by the YCC conversion means 1. Each of the parts of the preferred embodiment will hereinafter be described in further detail.

The YCC (luminance value Y and two color difference values Cb and Cr) conversion means 1 converts the R, G, and B values of image data D0 into a luminance value Y and two color difference values Cb and Cr according to the following Eq. (1)

$$Y=0.2990 \times R+0.5870 \times G+0.1140 \times B \ Cb=-0.1687 \times R-0.3313 \times G+0.5000 \times B+128 Cr=0.5000 \times R-0.4187 \times G-0.0813 \times B+128 \qquad (1)$$

Figure 2:
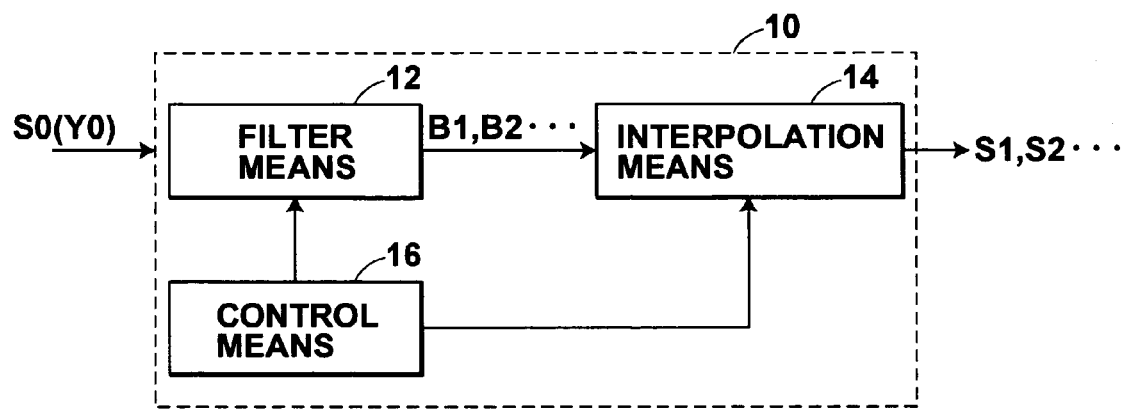
FIG. 2 is a block diagram showing the blurred-image generating means of the image processing apparatus shown in FIG. 1.

The blurred-image generating means 10 generates a plurality of blurred images employing the luminance value Y0 obtained by the YCC conversion means 1. The blurred-image generating means 10 is constructed as shown in FIG. 2. In the image processing apparatus of the preferred embodiment, the blurred-image generating means 10 generates blurred images by the methods disclosed in the aforementioned publication Nos. 10(1998)-75395 and 9(1997)-75395. As shown in FIG. 2, the blurred-image generating means 10 comprises three major parts: (1) filter means 12 for obtaining filtered images B1, B2, . . . , and Bn by performing a filter process; (2) interpolation means 14 for performing an interpolation process on each of the filtered images B1, B2, . . . , and Bn; and (3) control means 16 for controlling the filter means 12 and interpolation means 14. The filter means 12 performs a filter process by employing a low-pass filter. This low-pass filter can employ a filter F in the form of a 5×1 grid approximately corresponding to one-dimensional Gaussian distribution. This filter F can be obtained when σ=1 in the following Eq. (2):

$$f_{(t)} = e^{-\frac{t^2}{2\sigma^2}} \qquad (2)$$

The filter means 12 performs a filter process on the entirety of a target image that is a processing object by performing the filter process on the target image in the x direction and y direction of a pixel with the aforementioned filter F.

Figure 4:
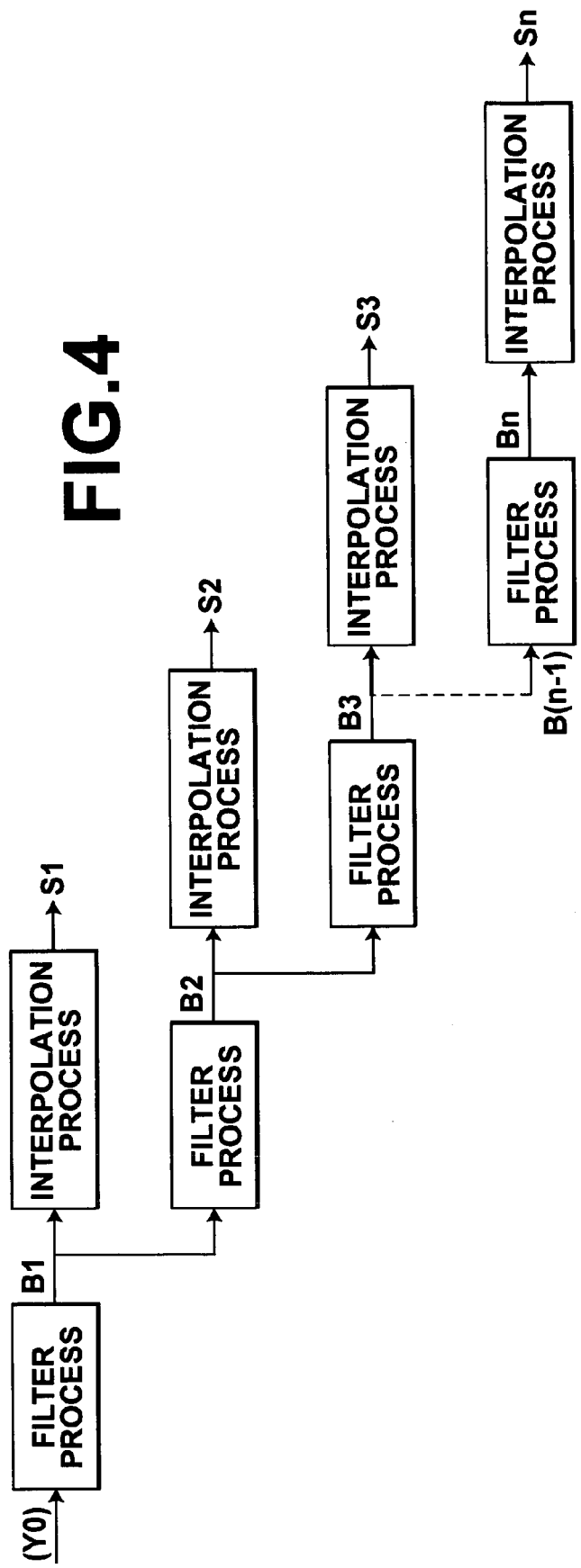
FIG. 4 is a diagram showing the processes that are performed in the blurred image generating means shown in FIG. 2.

FIG. 4 shows how the control means 16 of the blurred image generating means 10 causes the filter means 12 and interpolation means 14 to process an original image S0 (Y0).

Figure 3:
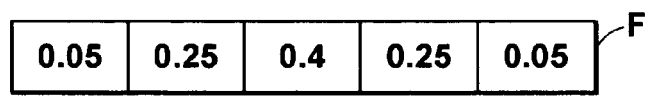
FIG. 3 is a diagram showing an example of a one-dimensional filter employed by the filter means of the blurred-image generating means.
Figures 5, 6, 7, 8:
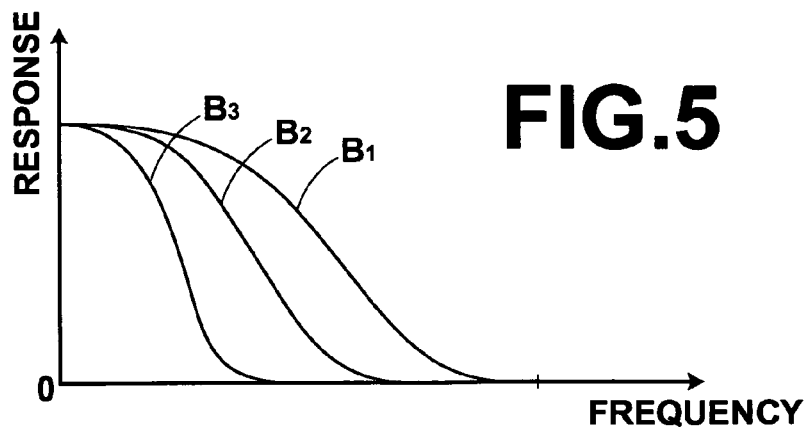
FIG. 5 is a diagram showing the frequency characteristic of each of the filtered images made by the filter means of the blurred image generating means shown in FIG. 2.
FIG. 6 is a diagram showing an example of a two-dimensional filter employed by the filter means of the blurred image generating means shown in FIG. 2.
FIG. 7 is a diagram showing an example of a filter employed when a filtered image is interpolated by the interpolation means of the blurred image generating means shown in FIG. 2.
FIG. 8 is a diagram showing an example of another filter employed when another filtered image is interpolated by the interpolation means of the blurred image generating means shown in FIG. 2.

As shown in the figure, the filter means 12 first performs a filter process on every other pixel of the original image S0 (Y0) with the filter F shown in FIG. 3. With this filter process, a filtered image B1(Y1) is obtained. The size of the filtered image B1 is ¼ of the size of the original image S0 in the x direction and ½ of the size of the original image S0 in the y direction. Then, the filter means 12 performs the filter process on every other pixel of the filtered image B1(Y1) with the filter F and obtains a filtered image B2(Y2). The filter means 12 repeats the filter process employing the filter F and obtains n filtered images Bk (where k=1 to n). The size of the filtered image Bk is reduced to $½^{2k}$ of the size of the original image S0. FIG. 5 shows the frequency characteristic of each of the filtered images Bk obtained by the filter means 12 when n=3, as an example. As shown in the figure, the filtered images Bk indicate that higher-frequency components of the original image S0 are eliminated as the value of k becomes greater.

In the image processing apparatus of the preferred embodiment, while the filter means 12 performs the filter process in the x direction and y direction of an image with the filter F shown in FIG. 3, the filter means 12 may perform the filter process on the original image S0 and filtered image Bk at a time with a 5×5 two-dimensional filter such as that shown in FIG. 6.

The interpolation means 14 causes the size of each of the filtered images Bk to be the same as that of the original image S0 by performing an interpolation process on each of the filtered images Bk obtained by the filter means 12. The interpolation process can be performed by various methods such as a B-spline method, but since the filter means 12 in the preferred embodiment employs the filter F based on a Gaussian signal as a low-pass filter, the interpolation means 14 employs a Gaussian signal as an interpolation coefficient for performing interpolation calculation in the interpolation process. This interpolation coefficient approximates to the following Eq. (3) when $\sigma=2^{k-1}$.

$$I_{(t)} = 2 \times \sigma \times e^{-\frac{t^2}{2\sigma^2}} \tag{3}$$

In interpolating the filtered image B1, σ equals 1 because k=1. When σ equals 1 in the aforementioned Eq. (3), a filter for interpolation is a 5×1 one-dimensional filter F1 such as the one shown in FIG. 7. The interpolation means 14 first enlarges the filtered image B1 to the same size as the original image S0 by interpolating a pixel having a value of 0 (hereinafter referred to as a 0-pixel) into the filtered image B1 at intervals of one pixel. The interpolation means 14 then obtains a blurred image S1 by performing the filter process on the enlarged image with the filter F1 shown in FIG. 7. This blurred image S1 has a number of pixels that corresponds to the number of pixels in the original image S0. That is, the blurred image S1 has the same size as the original image S0.

The filter F1 shown in FIG. 7 is a 5×1 filter, but before the filter F1 is used, a single 0-pixel is interpolated into the filtered image B1 at intervals of one pixel. Therefore, the interpolation process by the interpolation means 14 is practically equivalent to the filter process performed by two kinds of filters: a 2×1 filter (0.5 and 0.5) and a 3×1 filter (0.1, 0.8, and 0.1).

In performing interpolation on the filtered image B2 by the interpolation means 14, σ equals 2 because k=2. In the aforementioned Eq. (3), a filter corresponding to σ=2 is a 11×1 one-dimensional filter F2 shown in FIG. 8. The interpolation means 14 first enlarges the filtered image B2 to the same size as the original image S0 by interpolating three 0-pixels into the filtered image B2 at intervals of one pixel. The interpolation means 14 then obtains a blurred image S2 by performing the filter process on the enlarged image with the filter F2 shown in FIG. 8. The blurred image S2 has a number of pixels that corresponds to the number of pixels in the original image S0. That is, the blurred image S2 has the same size as the original image S0.

Similarly, the filter F2 shown in FIG. 8 is a 11×1 filter, but before the filter F2 is applied, three 0-pixels are interpolated into the filtered image B2 at intervals of one pixel. Therefore, the interpolation process by the interpolation means 14 is practically equivalent to the filter process performed by four kinds of filters: a 2×1 filter (0.5 and 0.5) and 3×1 filters (0.3, 0.65, and 0.05), (0.3, 0.74, and 0.13), and (0.05, 0.65, and 0.3).

Thus, the interpolation means 14 enlarges each of the filtered images Bk to the same size as the original image S0 by interpolating $(2^k-1)$ 0-pixels into each of the filtered images B2 at intervals of one pixel. And the interpolation means 14 obtains blurred images Sk by performing the filter process on each of the filtered images Bk, where 0-pixels are interpolated, with the filter having a length of $(3\times2^k-1)$ made based on the aforementioned Eq. (3).

Figure 9:
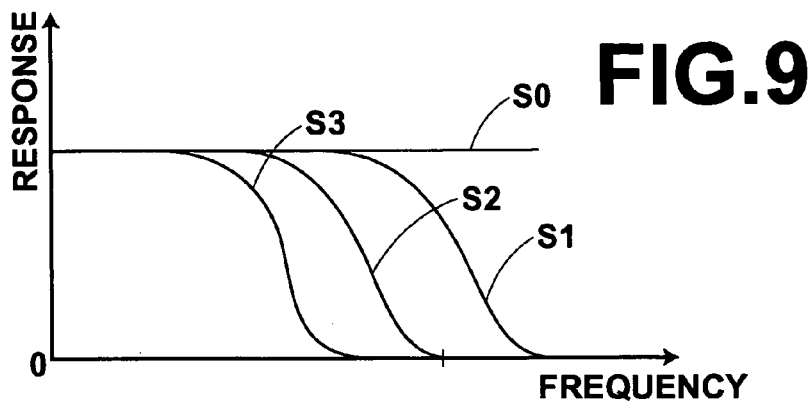
FIG. 9 is a diagram showing the frequency characteristic of each of the blurred images made by the blurred image generating means shown in FIG. 2.

FIG. 9 shows the frequency characteristic of each of the blurred images Sk obtained by the blurred image generating means 10 when n=3, as an example. As shown in the figure, the blurred images Sk indicate that higher-frequency components of the original image S0 are eliminated as the value of k becomes greater.

The band-limited image generating means 20 generates band-limited images T1, T2, . . . , and Tn respectively representing a plurality of frequency bands of the original image S0 according to the following Eq. (4), using the blurred images S1, S2, . . . , and Sn obtained by the blurred image generating means 10.

$$Tm=S(m-1)-Sm \tag{4}$$

in which m=1≦integer≦n.

Figure 10:
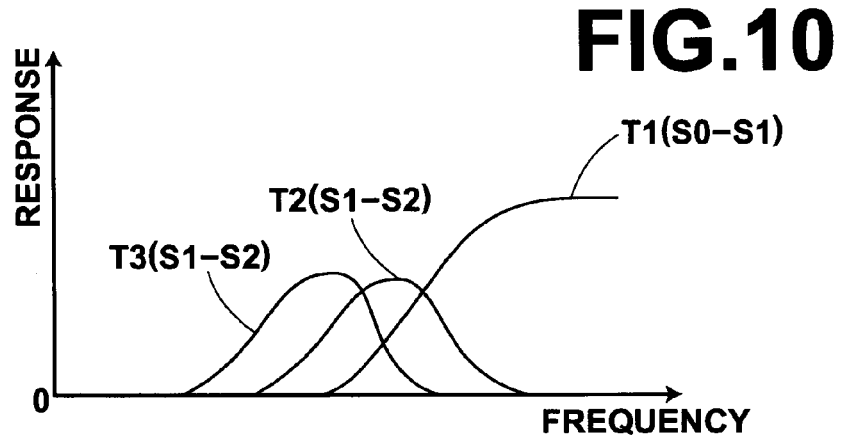
FIG. 10 is a diagram showing the frequency characteristic of each of the band-limited images made by the band-limited image generating means of the image processing apparatus shown in FIG. 1.

FIG. 10 shows the frequency characteristic of each of the band-limited images Tm obtained by the band-limited image generating means 20 when n=3, as an example. As shown in the figure, the band-limited images Tm represent the components in lower-frequency bands of the original image S0, as the value of m becomes greater.

The wrinkle component extraction means 30 extracts wrinkle, spot, and noise components (hereinafter referred to as wrinkle components) Q1, Q2, . . . , and Qn contained in the frequency bands to which the band-limited images Tm (where m=1 to n) obtained by the band-limited image generating means 20 correspond, by performing nonlinear conversion on each of the band-limited images Tm. This nonlinear conversion is the process of reducing an output value to an input value or less. At the same time, for an input value that is a predetermined threshold value or less, an output value becomes greater as the input value becomes greater. On the other hand, for an input value that is greater than the predetermined threshold value, an output value becomes less than or equal to an output value corresponding to the predetermined threshold value. In the preferred embodiment of the present invention, the nonlinear conversion is performed by a function f such as that shown in FIG.

11. In the figure, a broken line indicates output value=input value. That is, a function represented by the broken line has a gradient of 1. As shown in the figure, the function f for the nonlinear conversion employed in the wrinkle component extraction means 30 of the preferred embodiment has a gradient of 1 when the absolute value of an input value is a first threshold value Th1 or less and also has a gradient of less than 1 when the absolute value of an input value is between the first threshold value Th1 and a second threshold value Th2. The function f further outputs a constant value M whose absolute value is less than the absolute value of an input value, when the absolute value of the input value is greater than the second threshold value Th2. Note that the function f may employ the same function for each of the band-limited images, but a different function may also be employed for each of the band-limited images.

Figure 11:
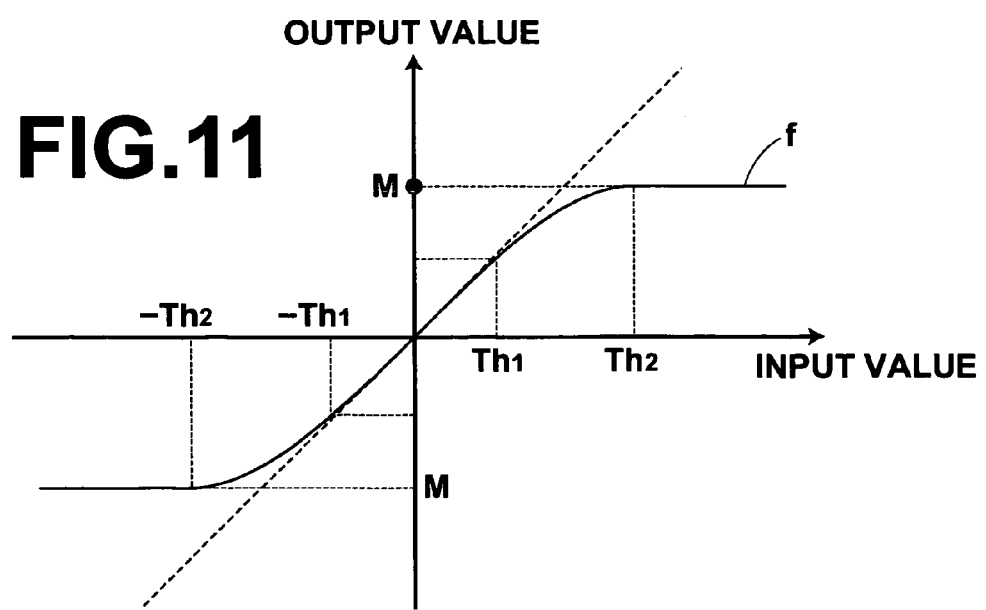
FIG. 11 is a diagram showing an example of a function employed by the wrinkle component extraction means of the image processing apparatus shown in FIG. 1.

The wrinkle component extraction means 30 uses the luminance value of each of the band-limited images as an input value, then performs nonlinear conversion on each of the band-limited images by employing the function f shown in FIG. 11, and extracts a wrinkle component Qm (where m=1 to n), contained in the frequency band to which each of the band-limited images corresponds, which comprises the luminance value of an output value.

The wrinkle component elimination means 40 obtains a wrinkle-eliminated image S'0 (Y1) by multiplying each of the wrinkle components Qm, extracted by the wrinkle component extraction means 30, by a subtraction coefficient β and then subtracting the wrinkle components Qm multiplied by the subtraction coefficient β from the original image S0 (Y0). The following Eq. (5) shows the process that is performed by the wrinkle component elimination means 40.

$$S'0 = S0 - \beta(S0)\sum_{m=1}^{n} Qm \quad (5)$$

in which
  n=integer≧2
  S0=original image
  Qm (where m=1 to n)=wrinkle component
  β=subtraction coefficient.

The subtraction coefficient β is β (S0). That is, it is determined in dependence on the luminance value Y0 of each pixel of the original image S0. More specifically, as the luminance value Y0 of a pixel becomes greater, the subtraction coefficient β for calculating the pixel value Y1 of that pixel becomes greater. The wrinkle component Qm extracted by the wrinkle component extraction means 30 sometimes contains a hair component. If the hair component is eliminated the same as the wrinkle component Qm, the hair part in a photographic image will blur and the picture quality of an image processed will not be very satisfactory. Typically, the skin part in which wrinkles have appeared is light (i.e., the luminance value is great) and the hair part is dark (i.e., the luminance value is small). In view of this fact, the present invention employs a great subtraction coefficient β for a pixel having a great luminance value in order to decrease the amount of subtraction (i.e., wrinkle elimination) of the hair part and increase the amount of subtraction (i.e., wrinkle elimination) of the skin part. In this manner, true wrinkle, spot, and noise components can be eliminated and, at the same time, a component representing the hair part can be left. Because there is no blurring at the hair part, the picture quality of an image processed is very satisfactory.

The output means 50 outputs as a processed image D1 an image (Y1, Cr0, and Cb0) comprising the luminance value Y1 obtained by the wrinkle component elimination means 40 and the two color difference values Cb0 and Cr0 of the original image D0 obtained by the YCC conversion means 1.

Thus, the image processing apparatus of the preferred embodiment generates a plurality of band-limited images Tm (where m=1 to n and n≧2) respectively representing the components in different frequency bands of the original images S0 (Y0), and then performs a nonlinear conversion process on these band-limited images to obtain a plurality of converted images (wrinkle components). And the pixel value (luminance value Y1) of a processed image is obtained by multiplying the pixel values of the converted images by the subtraction coefficient β determined according to the luminance value of the original image S0, and then subtracting the obtained value from the pixel value (luminance value Y0) of the original image S0. In this manner, the wrinkle, spot, and noise components in the different frequency bands of a photographic image can be effectively eliminated, whereby the skin can be beautified. In addition, wrinkle components are eliminated in a plurality of different frequency bands. This can prevent artifacts caused by the prior art in which the elimination of wrinkle components in only a single frequency band is performed in order to enhance the skin beautifying effect. Thus, a processed image of high picture quality can be obtained.

While the present invention has been described with reference to the preferred embodiment thereof, the image processing method, apparatus and program of the present invention are not to be limited to the details given herein, but may be modified within the scope of the invention hereinafter claimed.

For example, in the image processing apparatus of the preferred embodiment, the band-limited image generating means 20 obtains band-limited images according to the aforementioned Eq. (4), employing the original image S0 and blurred images Sk (where k=1 to n and n≧2). Also, the processing that are performed in the band-limited image generating means 20, wrinkle component extraction means 30, and wrinkle component elimination means 40 can be represented by the following Eq. (6). However, the processing in the band-limited image generating means 20, wrinkle component extraction means 30, and wrinkle component elimination means. 40 may be performed by the following Eq. (7), (8), or (9). That is, like the processing in the image processing apparatus of the preferred embodiment represented by the aforementioned Eq. (6), band-limited images may be obtained by performing a subtraction between images of frequency bands adjacent to each other (where the original image S0 is assumed to be adjacent in frequency band to the blurred image S1), employing the original image and blurred images. However, as indicated by Eq. (7), band-limited images may be obtained by a subtraction between each of all blurred images and the original image. In addition, as indicated by Eq. (8), band-limited images may be obtained by performing a subtraction between blurred images in adjacent frequency bands, without employing the original image. Furthermore, as indicated by Eq. (9), band-limited images may be obtained by performing a subtraction between the blurred image S1 and each of the remaining blurred images, without employing the original image.

$$S'0 = S0 - \beta(S0)\sum_{m=1}^{n} f_m(S(m-1) - Sm) \qquad (6)$$

in which
n=integer≧2
S0=original image
Sm (where m=1 to n)=blurred image
$f_m$=nonlinear conversion function
β=subtraction coefficient.

$$S'0 = S0 - \beta(S0)\sum_{m=1}^{n} \frac{1}{n} \cdot f_m(S0 - Sm) \qquad (7)$$

in which
n=integer≧2
S0=original image
Sm (where m=1 to n)=blurred image
$f_m$=nonlinear conversion function
β=subtraction coefficient.

$$S'0 = S0 - \beta(S0)\sum_{m=1}^{n-1} f_m(Sm - S(m+1)) \qquad (8)$$

in which
n=integer≧3
S0=original image
Sm (where m=1 to n)=blurred image
$f_m$=nonlinear conversion function
β=subtraction coefficient.

$$S'0 = S0 - \beta(S0)\sum_{m=2}^{n} \frac{1}{n-1} \cdot f_m(S1 - Sm) \qquad (9)$$

in which
n=integer≧3
S0=original image
Sm (where m=1 to n)=blurred image
$f_m$=nonlinear conversion function
β=subtraction coefficient.

The method for generating band-limited images is not limited to the method of generating blurred images from an original image and then generating band-limited images by employing the original image and/or blurred images, like the methods represented by the aforementioned Eqs. (4) and (6) to (9). The present invention can employ any method, as long as it can generate images representing the components in different frequency bands of an original image.

In the preferred embodiment, the entire photographic image is processed, but since the processing is performed for the purpose of beatifying the skin, only skin-colored parts may be extracted from a photographic image to perform a skin beautifying process on the extracted parts. In the case of performing the skin beautifying process on only a face part, the process may be performed on only the face part extracted by various face extraction techniques that have been proposed. In this manner, the amount of calculation required for the skin beautifying process can be reduced and blurring can be prevented from occurring at parts other than skin-colored parts or at parts other than a face part.

In the preferred embodiment, the subtraction coefficient β employed in eliminating wrinkle components is determined according to the luminance value Y0 of an original image. However, the subtraction coefficient may be varied according to information about a photographed person contained in a photographic image that becomes a processing object, in addition to the luminance value of an original image. Also, in the case where a photographed person is far advanced in years, the subtraction efficient may be made greater to enhance the skin-beautifying effect. Conversely, when a photographed person is far advanced in years, the subtraction efficient may be made smaller to weaken the skin-beautifying effect so that a processed image does not look artificial.

Particularly, the second threshold value Th2 employed in performing nonlinear conversion on band-limited images may also be varied according to information about a photographed person contained in a photographic image. Note that the information about a photographed person may be acquired by a recognition process or by referring to tag information, or that information may be manually input by an operator.

Parameters, such as threshold values for the subtraction efficient and nonlinear conversion, may be varied according to the magnitude of the skin beautifying effect desired by users as well as the information about a photographed person.

The above-described parameters may also be varied according to applications of photographic images such as images for photographing, a marriage ceremony, an automatic photographing machine, etc.

In the image processing apparatus of the preferred embodiment, an efficient skid-beautifying process is achieved by eliminating wrinkle components only in a luminance space, paying attention to the fact that a wrinkle component is a component of low amplitude representing light and darkness and has no color amplitude. However, noise components in colors, in addition to wrinkle components, may be eliminated by processing red, green, and blue components.

The image processing apparatus of the preferred embodiment employs the subtraction coefficient that becomes greater as the pixel value of an original image becomes greater, for the chief purpose of obtaining a skin-beautifying effect while inhibiting wrinkle and spot components. However, in the case where a chief purpose is to eliminate noise, a subtraction coefficient, which becomes smaller as the pixel value of an original image becomes greater, may be employed.

What is claimed is:

1. An image processing method comprising the steps of:
   generating a plurality of band-limited images respectively representing components of a plurality of frequency bands of a photographic image, based on said photographic image;
   obtaining a plurality of converted images by performing on respective pixel values of said band-limited images a nonlinear conversion process, in which an absolute value of an output value is reduced to an absolute value of an input value or less, and in which, for an input value whose absolute value is a predetermined threshold value or less, an absolute value of an output value becomes greater as an absolute value of said input value becomes greater and, for an input value whose absolute value is greater than said predetermined value, an absolute value of an output value becomes less than or equal to an absolute value of an output value corresponding to said predetermined threshold value;

multiplying the pixel values of said converted images by a predetermined subtraction coefficient; and obtaining a pixel value of a processed image by subtracting the pixel values of said converted images multiplied by said predetermined subtraction coefficient, from a pixel value of said photographic image.

2. The image processing method as set forth in claim 1, wherein said predetermined subtraction coefficient is determined according to a pixel value of said photographic image.

3. The image processing method as set forth in claim 2, wherein said predetermined subtraction coefficient is determined, according to a pixel value of said photographic image, so that it becomes greater as said pixel value becomes greater.

4. The image processing method as set forth in claim 1, wherein said nonlinear conversion process is a process of generating an absolute value of an output value approximately constant for an input value whose absolute value is greater than said predetermined threshold value.

5. The image processing method as set forth in claim 1, wherein said predetermined threshold value is determined according to a frequency band of said band-limited image to be processed.

6. An image processing apparatus comprising:

band-limited image generating means for generating a plurality of band-limited images respectively representing components of a plurality of frequency bands of a photographic image, based on said photographic image;

nonlinear conversion means for obtaining a plurality of converted images by performing on respective pixel values of said band-limited images a nonlinear conversion process, in which an absolute value of an output value is reduced to an absolute value of an input value or less, and in which, for an input value whose absolute value is a predetermined threshold value or less, an absolute value of an output value becomes greater as an absolute value of said input value becomes greater and, for an input value whose absolute value is greater than said predetermined value, an absolute value of an output value becomes less than or equal to an absolute value of an output value corresponding to said predetermined threshold value; and frequency inhibition means for multiplying the pixel values of said converted images by a predetermined subtraction coefficient, and for obtaining a pixel value of a processed image by subtracting the pixel values of said converted images multiplied by said predetermined subtraction coefficient, from a pixel value of said photographic image.

7. The image processing apparatus as set forth in claim 6, wherein said predetermined subtraction coefficient is determined according to a pixel value of said photographic image.

8. The image processing apparatus as set forth in claim 7, wherein said predetermined subtraction coefficient is determined, according to a pixel value of said photographic image, so that it becomes greater as said pixel value becomes greater.

9. The image processing apparatus as set forth in claim 6, wherein said nonlinear conversion means causes an absolute value of an output value to be approximately constant for an input value whose absolute value is greater than said predetermined threshold value.

10. The image processing apparatus as set forth in claim 6, wherein said predetermined threshold value is determined according to a frequency band of said band-limited image to be processed.

11. A computer readable medium encoded with a computer program for causing a computer to carry out:

a process of generating a plurality of band-limited images respectively representing components of a plurality of frequency bands of a photographic image, based on said photographic image;

a process of obtaining a plurality of converted images by performing on respective pixel values of said band-limited images a nonlinear conversion process in which an absolute value of an output value is reduced to an absolute value of an input value or less, and in which, for an input value whose absolute value is a predetermined threshold value or less, an absolute value of an output value becomes greater as an absolute value of said input value becomes greater and, for an input value whose absolute value is greater than said predetermined value, an absolute value of an output value becomes less than or equal to an absolute value of an output value corresponding to said predetermined threshold value;

a process of multiplying the pixel values of said converted images by a predetermined subtraction coefficient; and a process of obtaining a pixel value of a processed image by subtracting the pixel values of said converted images multiplied by said predetermined subtraction coefficient, from a pixel value of said photographic image.

* * * * *